INVENTOR
GESINUS DIEMER
FRITS GERZON
BY Frank R. Jerifari
AGENT

June 21, 1960 G. DIEMER ET AL 2,942,131

CIRCUIT ARRANGEMENT FOR CONVERTING AN ELECTRICAL SIGNAL AS A FUNCTION OF TIME INTO AN ELECTRICAL SIGNAL AS A FUNCTION OF POSITION

Filed Sept. 29, 1958 2 Sheets-Sheet 2

INVENTOR
GESINUS DIEMER
FRITS GERZON

BY Frank R. Jifari
AGENT

United States Patent Office 2,942,131
Patented June 21, 1960

2,942,131

CIRCUIT ARRANGEMENT FOR CONVERTING AN ELECTRICAL SIGNAL AS A FUNCTION OF TIME INTO AN ELECTRICAL SIGNAL AS A FUNCTION OF POSITION

Gesinus Diemer and Frits Gerzon, Emmasingel, Eindhoven, Netherlands, assignors to North American Philips Company, Inc., New York, N.Y., a corporation of Delaware Filed Sept. 29, 1958, Ser. No. 764,036

Claims priority, application Netherlands Oct. 2, 1957

15 Claims. (Cl. 313—94)

The invention relates to a circuit arrangement for converting an electrical signal as a function of time into an electrical signal as a function of position. Owing to losses in the converter, this conversion is generally attended from point to point with increasing attenuation of the supplied signal amplitude. The signal obtained as a function of position is generally fed to a conductive strip or plate for utilizing the signal.

With such circuit arrangements, the conversion takes place by supplying the electrical signal as a function of time to one or more delay circuits, which are provided at various points with tappings, via which they are connected to a strip or plate composed, for example, of photo-conductive material. If, after a given period, the total signal has a time lag such that at each of the tappings prevails just that voltage which, apart from the losses, corresponds to the locally required information, a source of radiation is switched on for a given period to irradiate the photo-conductive strip or plate, which thus becomes conductive, so that the information of each of the tappings can be transmitted to the elements connected to the photo-conductive strip or plate.

Such arrangements are used inter alia for the reproduction of television images; in this case the elements connected to the strip or plate consist of a material having electro-luminescent properties; the incoming signal is the television video signal, so that the elements will emit light, visible or invisible, at the instant the source of radiation is switched on, i.e. in accordance with the incoming television signal. Such an arrangement using one delay line is described in a copending application, Serial No. 748,752, and another arrangement using several delay lines is described in another copending application, Serial No. 748,753, both filed on July 15, 1958.

However, this involves the disadvantage that the delay circuit produces a certain loss of voltage, which may be quite considerable in some cases.

In order to obviate this disadvantage the circuit arrangement according to the invention has the feature that the conductivity of the strip or plate increases from point to point.

The strip or plate employed in the said arrangement is characterized in that the material of the strip or plate is applied in a manner such that the conductivity of the strip or plate in the working condition, increases from point to point in accordance with the use in the arrangement.

A few possible embodiments of the circuit arrangement according to the invention and of the strips or plates employed therein are shown in the accompanying drawing, in which:

Figs. 1, 2, 3*a* and 3*b* show a few embodiments of photo-conductive strips.

Fig. 4 shows a photo-conductive plate.

Fig. 5*a* shows a circuit arrangement in which a photo-conductive strip as shown in Fig. 1 is used.

Fig. 5*b* is a cross-sectional view of Fig. 5*a* along line A—A'.

Fig. 5*c* shows a modification of the embodiment of Figs. 5*a* and 5*b*.

Figure 1:
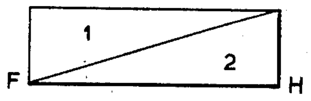

Fig. 1 shows, in a side-view, a photo-conductive strip comprising two kinds of photo-conductive material. The material designated by 1 has a comparatively poor photo-conductivity when it is irradiated with a given intensity (for example $10^{-4}\ \Omega^{-1}\ \text{cm.}^{-1}$), and may be composed for example, of CdS powder with 100 p.p.m. Cu atoms, acting as activating centres, and with 100 p.p.m. Ga atoms acting as extinction centres. The material designated by 2 has a comparatively good photo-conductivity (for example $10^{-3}\ \Omega^{-1}\ \text{cm.}^{-1}$), when it is irradiated with the same intensity as the material designated by 1 and may also be composed of CdS powder but now with 100 p.p.m. Cu atoms and 80 p.p.m. Ga atoms.

A photo-conductive substance is to be understood to mean a substance, of which the specific electrical impedance can be reversibly changed by corpuscular or electro-magnetic radiation. By applying the materials 1 and 2 in the form of wedges, it is ensured that the conductivity of the strip increases from F to H. If an electrical voltage is applied between the bottom and top sides of the strip, which voltage decreases linearly as a function of position from F to H, and if the strip is irradiated, from some source, from aside or from above, with an intensity which is constant at all points, the current passing through the strip will be constant owing to the increasing conductivity. It will be obvious that, if the applied voltage decreases not linearly but in accordance with a different functional relation, the current through the strip can be kept constant by adapting accordingly the boundary surface between the materials 1 and 2.

Numerous other methods are possible.

For example, the variable conductivity may be obtained by mixing the materials 1 and 2 which are on hand in a powdery state, and by varying the mixing ratio as a function of position during the manufacture, consisting for instance in applying the mixture to a solid substratum by a screening process.

At F the mixture must contain 100% or nearly 100% of the material designated by 1 and at H it must contain 100% or nearly 100% of the material designated by 2. When the increase in conductivity going from F to H must be linear the mixture must also be varied linearly. So, midway between F and H the mixture consists of 50% of the material with good and 50% of the material with poor photoconductivity.

If the increase in conductivity is not linear, the variation of the mixture should be adapted to this non-linear increase.

As an alternative, instead of using two materials, a plurality of materials with different specific conductivities may be employed. For the composition of the strip use may be made of the wedge shape or of the variable mixing ratio.

A further possibility consists in that one kind of photo-conductive material is used, for example Cu-activated CdS powder, this photo-conductive powder being bound with some plastic binder, the ratio between the quantities of powder and binder being raised in the direction from F to H. So at F the ratio between powder and binder should be 70:30 and at H this ratio should be 85:15.

A further method consists in that one kind of photo-conductive material is used, whereas the activation is varied. For example, CdS-powder may be contaminated by Cu- or Cu- and Hg-atoms. If only Cu is used, the quantity of Cu must increase from F to H, for example from 10 to 300 p.p.m. If, on the contrary, both Cu- and Hg-impurities are used, the ratio Cu:Hg at the spot H is about 30 times higher than at the spot F; in this case Cu may vary by a factor 30 and Hg may be kept constant or, conversely, Cu may be kept constant and Hg may diminish 30 times, or else, both may vary by a factor $\sqrt{30}$. The increase in conductivity is not directly proportional to the variation of the impurities, so that the extent of the variation in conductivity along the said strip must be determined from point to point in accordance with the voltage losses along the delay circuit to be compensated.

Of these impurities the Cu-atoms act as activating centres, whereas the Hg-atoms operate as extinction centres.

Figure 2:
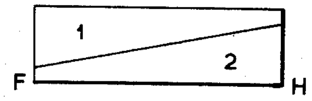

Fig. 2 is a plan view of a similar strip, formed by means of the same materials 1 and 2. The voltage may be applied between the side edges and the sources of radiation may be arranged below or over the strip.

Figure 3A:
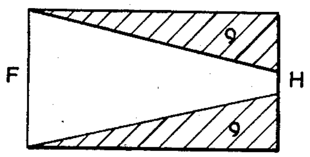
Figure 3B:
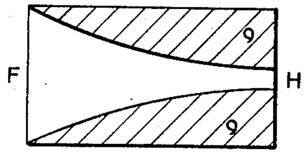

As shown in Figs. 3*a* and 3*b* the conductivity varying as a function of position is obtained by reducing at least one of the dimensions of the space between the electrodes in a direction at right angles to the direction F—H. Fig. 3*a* (non-hatched part) shows a trapezium, which may be used with a linearly decreasing voltage; Fig. 3*b* (not-hatched part), however relates to a voltage decreasing non-linearly as a function of position; in this case the shapes of the sides (that is to say the boundaries between the hatched and the non-hatched parts) must exhibit a similar non-linear relationship.

The possibility shown in Figs. 3*a* and 3*b* may be realized in a very simple manner, for example, by using a rectangular strip of photo-conductive material, to which is applied by vaporization a metal layer 9 (hatched part), the width of this metal layer being varied either linearly (Fig. 3*a*) or according to some function (Fig. 3*b*).

Figure 4:
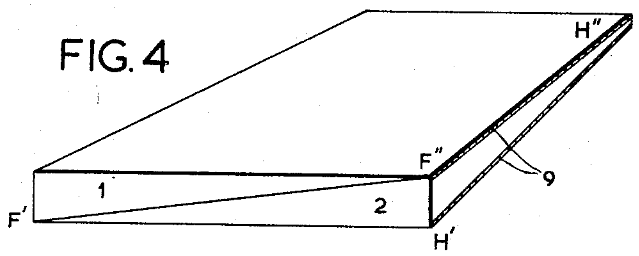

A further possibility consists in combining the configuration shown in Fig. 1 with that shown in Figs. 3*a* or 3*b*. In this case a large plate can be formed, in which F—H of Fig. 1 designates the width F′—H′, and F—H of Fig. 3 designates the length of the plate F″—H″. Fig. 4 shows such a plate. The electrodes 9 must, in this case, be applied not only on the side edges, but to the entire width, for example in the form of insulated strips extending in the direction of F′—H′. It will be obvious that it is possible to apply twice the principle illustrated in Fig. 1 or twice one of the principles illustrated in the further figures.

These strips and plates may be employed in a circuit arrangement, in which a voltage as a function of time is fed to a delay circuit, so that after a certain delay time per metre of the circuit the voltage supplied as a function of time is converted into a voltage as a function of position.

It should be noted that the term "a voltage as a function of position" is to be understood to mean the voltage pattern along the delay circuit at the instant when a source of radiation, irradiating the photo-conductive material, is switched on for a short instant.

If a television signal is fed to the delay circuit, this means that the amplitude of the voltage at each tapping of the delay circuit corresponds to the brightness of the image point to be reproduced. As a matter of fact, the amplitude of the voltage at the tapping concerned varies continuously, but for the short instant the source of radiation is switched on, the voltage amplitude at the tapping concerned may be assumed to be substantially constant.

Figure 5A:
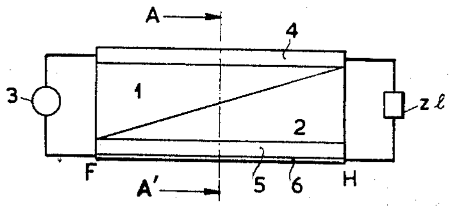
Figure 5B:
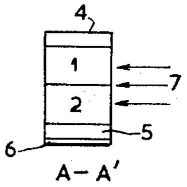
Figure 5C:
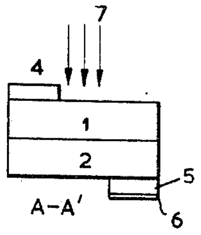

This is illustrated in Fig. 5, of which Fig. 5*a* is a side view and Figs. 5*b* and 5*c* show cross sectional views at the areas A—A′. According to Fig. 5*a* the voltage source 3 supplies a voltage as a function of time to the electrical or electro-acoustical delay circuit 4, which is terminated by its characteristic impedance $Z_1$, via the transparent electrode 6 connected to the lower side of the voltage source 3. Between the delay circuit 4 and the layer 5, composed of a material capable of emitting or extinguishing under the action of applied voltages, is provided the strip shown in Fig. 1. The layer 5 may be composed, for example, of chlorine-manganese 1000 p.p.m. activated zinc sulphide powder and under the action of an applied voltage this material will emit light. An example of a material which will extinguish under the action of applied voltages, is described in the article of G. Destriau and H. F. Irvey in P.I.R.E. 1955, pages 1911–1938 especially Chapter III. The delay circuit 4 may be constructed in numerous ways. For example, a wire wound helically on an auxiliary mandril may, subsequent to removal of the mandril by etching be baked in a material such as ferrite, having an $\epsilon_r$ of 20 and a $\mu_r$ of 100.

A structure as shown in Fig. 5 and having a variable photoconductivity may be formed as follows.

On a glass support, which serves as a base for the whole structure small coatings of tin oxide or indium oxide, with an alloy of antimony elements of about ½%, are firmly connected to the glass support by means of a spraying technique, this coating forming the transparent electrode 6.

Thereafter the electroluminescent layer 5, with a thickness of about 20$\mu$, is formed on the electrode 6 by means of a screening process.

Printing techniques may be used, if necessary, to print some electrodes onto the layer 5. These electrodes, which should be in the form of small metal islands, improve the contact between the layer and the photo-conductive layer. They act so to say as electron reservoirs between the two layers.

The photo-conductive layer 1, 2 is brought onto the layer 5 by means of a screening technique. Thereby two sorts of powders are used, one having the said poor photo-conductivity, the other having the said good photo-conductivity. These two powders are mixed together and, going from F to H, this mixture may be varied as mentioned above.

Finally identical electrodes as arranged between layer 5 and the photo-conductive layer, are printed onto that surface of the photo-conductive layer which is remote from the layer 5. These last-mentioned electrodes form the contacts between the photo-conductive layer and the delay circuit 4, which is firmly held on the photo-conductive layer by means of a binder or the like. It is known that always a certain voltage loss occurs across a delay circuit, so that, if the materials 1 and 2 would have the same specific conductivity, the voltage applied to the layer 5 as a function of position would not be a true image of the voltage supplied by the source 3 as a function of time.

In accordance with the invention the conductivity of the strip of the materials 1 and 2 is caused to increase in a manner similar to the decrease in amplitude across the circuit 4. Thus, the voltage applied to 5 and hence the current required for the emitting of the layer 5 as a function of position, will again be a true reproduction of the voltage supplied by the source 3 as a function of time. It is assumed here that the impedance of the elements of the layer 5 is low with respect to the elements connected in series herewith. It will be obvious, however, that even if this condition is not fulfilled, the desired effect may be obtained by using a different proportioning of the layers 1 and 2. If the voltage loss across the circuit 4 is so high that compensation by means of the increasing conductivity is not completely possible, an additional compensation may be obtained by means of an amplifier, which is connected between 4 and 3, the amplification increasing each time during given periods as a function of time. The conductivity may be ensured by irradiating the photo-conductive strip from aside, as is designated in Fig. 5*b* by 7 or from above, as is shown in Fig. 5*c*. If, in the case of Fig. 5*c*, a satisfactory contact between 4 and the top side of 1 and between 5 and the bottom side of 2 is provided, the variable thicknesses of the layers 1 and 2 will determine this conductivity from point to point, since the radiation 7 renders the photo-conductive strip conductive in the centre.

Such an arrangement may be used, for example, in a television reproducing system, in which 3 supplies the television video signal, which contains information for $n$ horizontal lines per image and for $m$ images per second. The total delay time of the circuit 4 must then be 1/m.n sec. After 1/m.n sec. the source of radiation, supplying the radiation 7, is switched on for a short instant, so that the total voltage pattern, distributed across the circuit 4 and containing the information for one line, is transferred to 5 by the photoconductive strip which is then conductive, so that the strip will emit in accordance with the line information supplied by 3.

The light produced by 5 can then be projected line by line onto a screen by means of a rotating optical system or it may be observed directly via the optical system.

Figure 6:
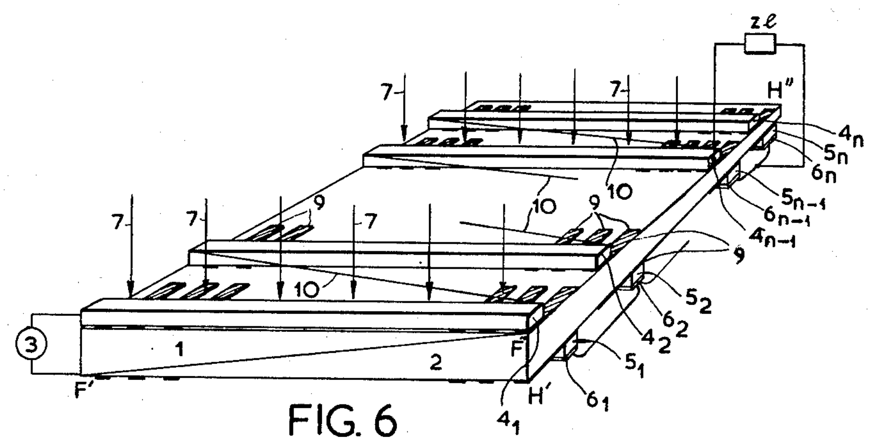
Fig. 6 shows diagrammatically a reproducing device in which a plate as shown in Fig. 4 is employed.

A further possibility of observing the total television image is illustrated in Fig. 6. According to this Figure $n$ arrangements as shown in Fig. 5*a* are provided on a plate as shown in Fig. 4. The source 3 is connected to the first delay circuit $4_1$ and to the electrode 6 (not visible on the left-hand part of the drawing). This electrode 6 consists of the interconnected conductors $6_1$—$6_n$, which are provided on the bottom sides of the strips $5_1$—$5_n$. The delay circuits $4_1$—$4_n$ are interconnected by the non-delaying connections 10, so that, together with the impedance $Z_1$, a closed circuit is formed, having a total delay time of 1/m. sec. After 1/m. sec. a voltage pattern has been distributed among the $n$ circuits, so that the voltage pattern of each circuit, apart from the losses, corresponds to the line information concerned. Each time after 1/m. sec. the source of radiation, supplying the radiation 7, is switched on for a short instant, so that the voltage pattern is transferred to the associated strips 5, which will emit in accordance with the information supplied. The losses per circuit 4 are compensated in the direction F′—H′ by the difference in conductivity of the materials 1 and 2, but, since the voltage at the $k^{th}$ circuit, supplied via the $k$—1 preceding circuits, has been attenuated, the decreasing thickness in the direction F″—H″ has to compensate this voltage loss. Since the delay circuits must not be short-circuited, separate metal islands 9 must be provided throughout the width of the plate. If such an intimate contact is not necessary the local electrodes 9 may be completely omitted. Moreover, the bottom side of the plate may be flat and the decreasing thickness may be provided only on the top side. As an alternative, if different materials are used to compensate the voltage loss in the direction F″—H″, the electrodes 9 may, if desired, be omitted. As a matter of course, all methods indicated with reference to the strip shown in Fig. 5 may be employed for the plate shown in Fig. 6 in order to obtain a variable conductivity.

If the television signal supplied by 3 is composed in accordance with the principle of interlacing, it is not the circuits $4_1$, $4_2$ and so on that are to be interconnected, but the circuits $4_1$, $4_3$, $4_5$ and so on and the circuits $4_2$, $4_4$, $4_6$ and so on. The end of the source 3, remote from the electrodes 6, is then alternately connected to the circuits $4_1$ and $4_2$ in accordance with the information associated with the raster concerned. The source of radiation must then be switched on for a short instant, after ½ m. sec. each.

Figures 7, 8:
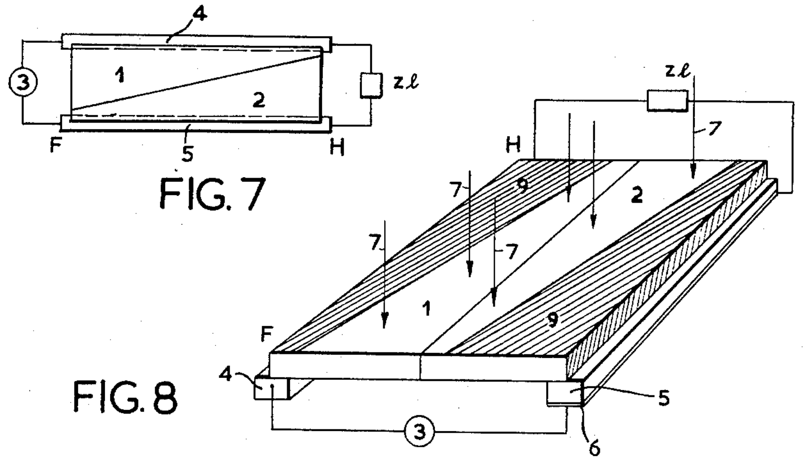
Figs. 7 and 8 show further embodiments employing photo-conductive strips.

A further possibility, in which the strip shown in Fig. 2 is used, is illustrated in Fig. 7. The delay circuit 4 and the electro-luminescent strip 5 are provided on either side of the photo-conductive strip and the required contacts are established with the aid of additional electrodes. The photo-conductive strip may be irradiated from above.

A further embodiment is shown in Fig. 8, in which the principles illustrated in Figs. 2 and 3 are combined. By providing the electrodes 9, a decreasing portion of the material 1 of poor conductivity and an increasing portion of the good conductive material 2 is used from F to H. The electrode 9, which establishes the contact between the delay circuit 4 and the material 1, must not short-circuit the circuit 4. Therefore, discreet connecting points to 4 must be provided from the electrode 9, subdivided into relatively insulated portions, these parts corresponding to the number of image points to be reproduced by 5.

It will be obvious that by combining $n$ arrangements as shown in Fig. 7 or Fig. 8 in a manner as shown in Fig. 6 a reproducing system can be constructed, in which after 1/m. sec. a complete image can, each time, be rendered visible.

Figure 9:
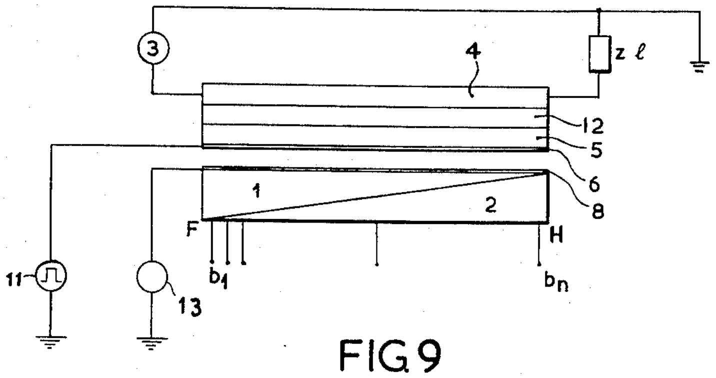
Fig. 9 shows diagrammatically one embodiment in which a photo-conductive strip as shown in Fig. 1 is used to transfer indirectly a signal voltage to a reproducing panel.

Finally Fig. 9 shows a circuit arrangement, in which the strip shown in Fig. 1 is not used directly, but indirectly. The arrangement now comprises two portions, which are electrically insulated from each other and of which the top portion consists of the delay circuit 4, a layer 12 of unilaterally conductive or of voltage-dependent, non-linear material, an electro-luminescent layer 5 and a transparent electrode 6. One end of the delay circuit 4 is connected to the voltage source 3, which supplies the television signal, and the other end to its characteristic impedance $Z_1$, while 3 and $Z_1$ are connected to each other and to ground. Moreover, 6 is connected to a voltage source 11, which supplies a pulsatory voltage.

The lower portion consists of a photo-conductive strip 1, 2 as shown in Fig. 1, which is covered on one side by a transparent electrode 8 and on the other side by a plurality of tappings $b_1 \ldots b_n$. These tappings may be connected, for example, to a television reproducing panel, which is provided with $b_1 \ldots b_n$ vertical conductors and $a_1 \ldots a_N$ horizontal conductors. Between the said vertical and horizontal conductors provision is made of elements which emit or extinguish in accordance with the potential differences between the conductors. If the vertical conductors of the panel are connected to the tappings of the device shown in Fig. 9 and if the conductors $a_1 \ldots a_N$ are alternately connected to ground potential, in synchronism with the line information concerned, supplied via 3 to 4, the information of 3 can be transferred to the elements concerned of the reproducing panel via the device shown in Fig. 9.

Also in this case there is the disadvantage that a voltage loss, due to the circuit 4, results in that the layer 5 does not emit in accordance with the information supplied by 3, but with a decreasing intensity deviating therefrom. If the specific conductivity of the photo-conductive strip is the same throughout the strip, this means that owing to the decreasing intensity of the light produced by 5, the conductivity of the photo-conductive strip 1, 2 is not in accordance with the information supplied by 3, so that the auxiliary alternating voltage, which is fed by 13 to the tappings $b_1 \ldots b_n$ and which has to excite finally the elements of the reproducing panel, varies from tapping to tapping not only with the information supplied by 3, but also with the voltage drop across the circuit 4. By providing poor conductivity for 1 and a good conductivity for 2, this disadvantage can be obviated. It is true that with a constant amplitude of the voltage supplied by 3, the intensity of the radiation produced by 5 decreases, but going from F to H the effective conductivity can be kept constant, even if the intensity of the incident radiation decreases. Also in this case numerous modifications are possible. For example, also a strip as shown in Figs. 2 or 3 may be used in the arrangement shown in Fig. 9 and also the electrodes 8 may be provided on 2 and the tappings $b_1 \ldots b_n$ on 1 if only the principle of an increasing conductivity from F to H is observed.

The principle need not be restricted to television systems. In all those cases in which a signal supplied as a function of time is converted into a signal as a function of position which conversion is attended with certain losses, the present principle may be successfully applied; thus, for example, for a so-called radar plotting or for a memory system, in which the information is supplied as a function of time to 4, but can be directly obtained from the tappings $b_1 \ldots b_n$.

It will furthermore be obvious that it is not always necessary to use photo-conductive material and that other material, which can be abruptly rendered conductive, may be used. For example, unilaterally conductive material such as p-n activated silicon or germanium may be used, while, by means of a suitably chosen bias voltage, the specific conductivity is caused to be very low (for example $\geq 10^{-6}$ ohm$^{-1}$ cm.$^{-1}$), as long as the signal voltage as a function of time has not yet been converted completely into a signal voltage as a function of position. Not until the instant this conversion is completed, the bias voltage is suppressed, so that the specific conductivity of the unilaterally conductive material increases (for example $\leq 10^{-3}$ ohm$^{-1}$ cm.$^{-1}$), but varies from point to point, in order to compensate the occurring volttage loss. As an alternative voltage-dependent, non-linear material may be employed, whose impedance decreases when the applied voltage increases. This material which may be composed of cadmium sulphide powder in an ethyl cellulose binder has the advantage over the unilaterally conductive material that no bias voltage need to be applied, since this material has very poor conductivity at an applied voltage of zero volt. Not until the said conversion has been completed, the voltage-dependent material can be brought into the state of good conductivity by means of a voltage of the desired polarity.

A complete conversion is to be understood to mean herein that if the delay time of the delay circuit is 1/m.n sec. the signal voltage supplied as a function of time is distributed, after 1/m.n sec., as a voltage pattern along a delay circuit. This means: after 1/m.n sec. the conversion is complete, so that always after 1/m.n sec. the bias voltage can be cut off for a short instant.

In accordance with the latter principle, it is therefore possible to cause not only the conductivity of the photoconductive strip (of the materials 1 and 2) to increase going from F to H, but also the conductivity of the layer 12 of unilaterally conductive material or of voltage-dependent, non-linear material. The variation in the bias voltage may be realized by means of the voltage source 11. The voltage loss across the circuit 4 may then be compensated, at will, by means of the conductivity of the layer 12, which varies in the operative state and/or of the conductivity of the photoconductive strip. As an alternative, the top portion of the arrangement shown in Fig. 9 may be used separately. The radiation produced by 5 may be spread by means of a rotating optical system, as is described with reference of the arrangement shown in Fig. 5.

What is claimed is:

1. An electrical device comprising means for receiving a signal containing time-varying information and converting same to a series of space-displaced voltages, input means for supplying a signal to said converting means, output means for deriving said space-displaced voltages, said converting means attenuating said signal, and a conductive member intermediate the converting means and the output means and possessing a graded conductivity that increases in value starting from a point in the vicinity of the input means of the converting means, whereby the attenuation of the signal may be compensated.

2. An electrical device comprising a plural-tapped delay circuit, input means for supplying to said delay circuit a signal containing time-varying information, output means for deriving said signal via the taps in the form of space-displaced voltages, said delay circuit attenuating said signal as it passes therethrough, and a photoconductive member intermediate the delay circuit taps and the output means and possessing a graded conductivity that increases in value starting from a point in the vicinity of the input means of the delay circuit, whereby the attenuation of the signal may be compensated.

3. An electrical device comprising a plural-tapped elongated delay circuit terminated by its characteristic impedance, input means for supplying to one end of said delay circuit a signal containing time-varying information, output means for deriving said signal via the taps in the form of space-displaced voltages, said delay circuit attenuating said signal as it travels therethrough, and an elongated photoconductive member coupled on one side to the delay circuit taps and on the other side to the output means and possessing a graded conductivity that increases in value starting from a point in the vicinity of the input means to its opposite end, whereby the attenuation of the signal may be compensated.

4. A device as set forth in claim 3 wherein the photoconductive member is composed of a first material having a low specific conductivity and a second material having a high specific conductivity.

5. A device as set forth in claim 4 wherein the two materials are provided in separate layers tapered in opposite directions in the longitudinal direction of the photoconductive member.

6. A device as set forth in claim 3 wherein the photoconductive member comprises photoconductive particles and an insulating binder, and the amount of the photoconductive material increases in the longitudinal direction of the member.

7. A device as set forth in claim 3 wherein the photoconductive member comprises photoconductive material activated by significant impurities, and the concentration of the impurities increases in the longitudinal direction of the member.

8. A device as set forth in claim 3 wherein the photoconductive member comprises photoconductive material containing activating impurities and extinguishing impurities, and the ratio of concentrations of the said activating and extinguishing impurities varies in the longitudinal direction of the member.

9. A device as set forth in claim 3 wherein the photoconductive member is constituted of photoconductive material and is tapered.

10. An electrical device comprising a plural-tapped elongated delay circuit, input means for supplying to one end of said delay circuit a signal containing time-varying information, output means for deriving said signal via the taps in the form of space-displaced voltages, said delay circuit attenuating said signal as it travels therethrough, and a plate-like, photoconductive member intermediate the delay circuit taps and the output means and possessing a graded conductivity that increases in value starting from a point in the vicinity of the input means, whereby the attenuation of the signal may be compensated.

11. A device as set forth in claim 10 wherein the photoconductive member comprises two photoconductive materials of different conductivity in separate layers which taper in opposite directions in one direction, said member being tapered in a direction at right angles to said one direction.

12. A device as set forth in claim 10 wherein the photoconductive member comprises two photoconductive materials of different conductivity, ratios of the quantities of each of the materials varying in two orthogonal directions of the member.

13. An electrical device comprising a plural-tapped delay circuit, input means for supplying to said delay circuit a signal containing time-varying information, output means for deriving said signal via the taps in the form of space-displaced voltages, said delay circuit attenuating said signal as it passes therethrough, a photoconductive member intermediate the delay circuit taps and the output means and possessing a graded conductivity that increases in value starting from a point in the vicinity of the input means of the delay circuit, whereby the attenuation of the signal may be compensated, and an electroluminescent member coupled to the output means for activation by the space-displaced voltages.

14. A device as claimed in claim 13 wherein means are provided for periodically irradiating the photoconductive member.

15. A device as claimed in claim 13 including plural elements exhibiting non-linear conductivity whose conductivity varies in accordance with the location of the element relative to the input means of the delay circuit.

References Cited in the file of this patent

UNITED STATES PATENTS 2,818,531 Peek, Jr. ---------------- Dec. 31, 1957